(12) United States Patent
Eo et al.

(10) Patent No.: US 12,124,820 B1
(45) Date of Patent: Oct. 22, 2024

(54) GRID LAYOUT SETTING METHOD FOR MULTI DEVICE RESPONSIVE PAGE AND COMPUTER-READABLE MEDIUM FOR PERFORMING THE SAME

(71) Applicant: INSWAVE SYSTEMS CO., LTD., Seoul (KR)

(72) Inventors: Se Yong Eo, Seoul (KR); Woog Lae Kim, Seoul (KR)

(73) Assignee: INSWAVE SYSTEMS CO., LTD., Seoul (KR)

( * ) Notice: Subject to any disclaimer, the term of this patent is extended or adjusted under 35 U.S.C. 154(b) by 0 days.

(21) Appl. No.: 18/662,412

(22) Filed: May 13, 2024

(30) Foreign Application Priority Data

May 12, 2023 (KR) ........................ 10-2023-0061502
Dec. 8, 2023 (KR) ........................ 10-2023-0177203

(51) Int. Cl.
*G06F 8/34* (2018.01)
*G06F 3/0482* (2013.01)

(52) U.S. Cl.
CPC .............. *G06F 8/34* (2013.01); *G06F 3/0482* (2013.01)

(58) Field of Classification Search
CPC ................................. G06F 8/34; G06F 3/0482
USPC ........................................................ 717/109
See application file for complete search history.

(56) References Cited

U.S. PATENT DOCUMENTS

| 7,320,104 | B2 * | 1/2008 | Lynn ..................... G06F 40/106 |
| | | | 715/251 |
| 10,768,774 | B2 * | 9/2020 | Blinn .................. G06F 16/9577 |
| 2015/0088669 | A1 * | 3/2015 | Kwak ................. G06F 16/9577 |
| | | | 715/234 |

(Continued)

FOREIGN PATENT DOCUMENTS

| KR | 101282970 B1 | 7/2013 |
| KR | 20150032093 A | 3/2015 |
| KR | 101667266 B1 | 10/2016 |

(Continued)

OTHER PUBLICATIONS

Chu, David C., and Marty Humphrey. "Mobile ogsi. net: Grid computing on mobile devices." Fifth IEEE/ACM International Workshop on Grid Computing. IEEE, 2004. pp. 182-191. (Year: 2004).*

(Continued)

*Primary Examiner* — Satish Rampuria
(74) *Attorney, Agent, or Firm* — IP & T GROUP LLP

(57) ABSTRACT

Grid layout setting method for multi device responsive page and program performing the same disclosed. The grid layout setting method includes executing a setting window for a grid layout according to user input, displaying a plurality of grid layout setting screens within the setting window, setting a plurality of first grid areas for a first device within a first grid layout setting screen and matching a plurality of group components corresponding to one grid item to each of the plurality of first grid areas, setting a plurality of second grid areas for a second device within a second grid layout setting (Continued)

screen and matching a portion or all of the plurality of group components to each of the plurality of second grid areas and generating grid templates for each multi-device, wherein a responsive Page for the multi-devices is developed corresponding to the grid templates for each multi-device.

6 Claims, 15 Drawing Sheets

(56) References Cited

U.S. PATENT DOCUMENTS

| | | | | |
|---|---|---|---|---|
| 2017/0102927 | A1* | 4/2017 | Gunther, Jr. | G06F 8/38 |
| 2019/0073091 | A1* | 3/2019 | Chisholm | G09G 5/14 |

FOREIGN PATENT DOCUMENTS

| | | |
|---|---|---|
| KR | 101771475 B1 | 8/2017 |
| KR | 20200088152 A | 7/2020 |
| KR | 20200112020 A | 10/2020 |
| KR | 20220132458 A | 9/2022 |
| KR | 20230080034 A | 6/2023 |

OTHER PUBLICATIONS

Ni, Tao, et al. "A survey of large high-resolution display technologies, techniques, and applications." IEEE Virtual Reality Conference (VR 2006). IEEE, 2006. pp. 223-236. (Year: 2006).*

Halpern, Matthew, et al. "Mosaic: cross-platform user-interaction record and replay for the fragmented android ecosystem." 2015 IEEE International Symposium on Performance Analysis of Systems and Software (ISPASS). IEEE, 2015 .pp. 215-224. (Year: 2015).*

* cited by examiner

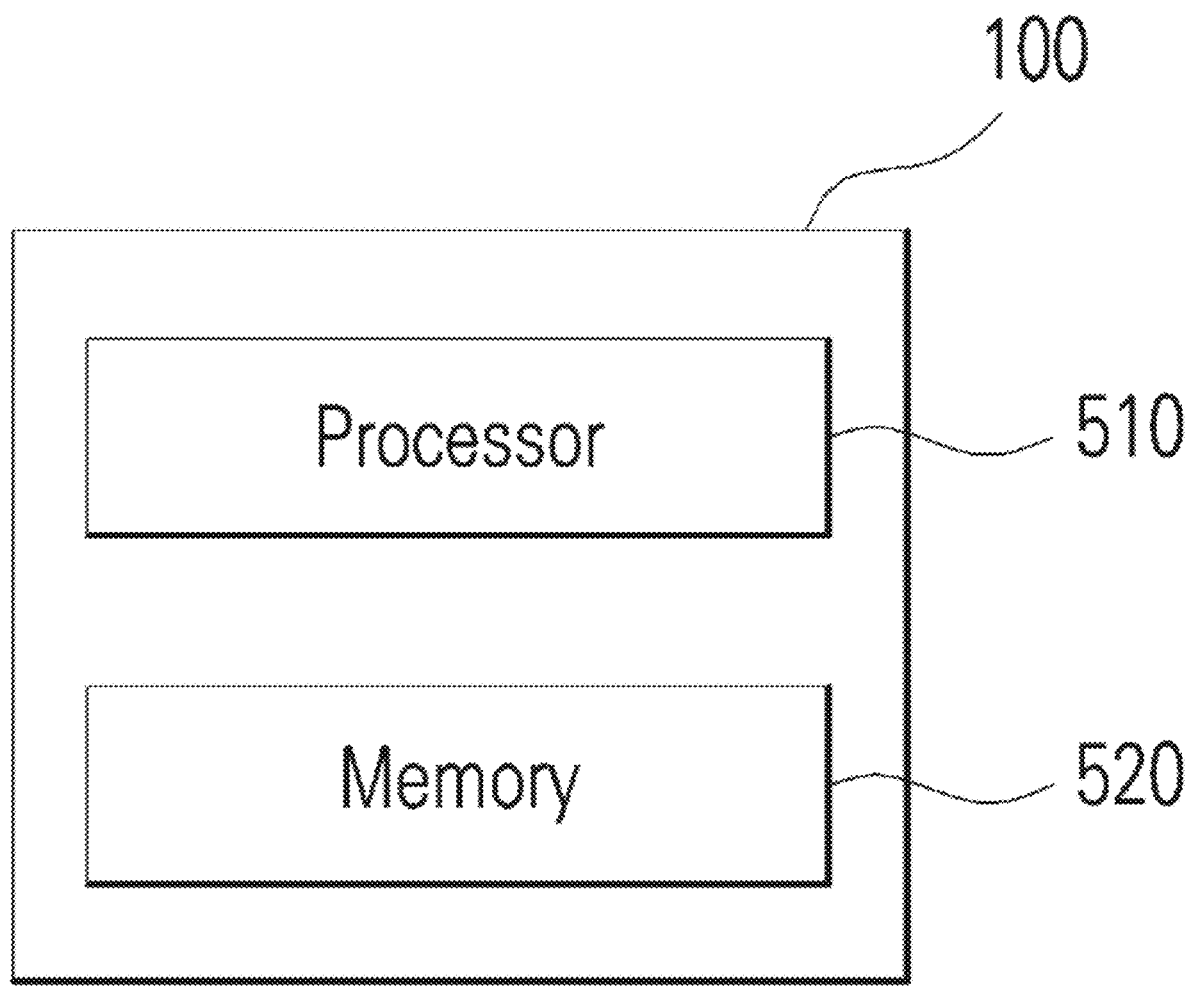

GRID LAYOUT SETTING METHOD FOR MULTI DEVICE RESPONSIVE PAGE AND COMPUTER-READABLE MEDIUM FOR PERFORMING THE SAME

CROSS-REFERENCE TO RELATED APPLICATION

This patent document claims the priority and benefits of Korean patent application Nos. KR 10-2023-0061502 and KR 10-2023-0177203 filed on May 12, 2023 and Dec. 8, 2023, respectively. The entire disclosure of each of the foregoing applications is incorporated herein by reference in its entirety.

TECHNICAL FIELD

The present invention relates to grid layout setting method for multi device responsive page and computer-readable medium for performing the same.

RELATED ARTS

With the advancement of computer technology, there is a wide variety of software being developed today. To develop software, a program development device is generally used. Previously, developers had to do a lot of manual coding, but now, software is developed more easily using a graphical user interface (GUI).

When developing a program, objects such as buttons, boxes, grids, scroll views that are graphically placed at specific locations on the screen often need to be repositioned, changed to a different parent object, or reordered among siblings, but conventional program development devices have limitations that editing objects like these was not easy.

As a related patent, Korean Patent No. 10-1282970, filed by the present applicant, discloses a situation-aware positioning device and method for screen objects during program development.

The matters described in the related art are for understanding the background of the invention, and cannot be assumed to be prior art already known to those skilled in the art in the field to which this technology belongs.

SUMMARY

The present invention is to provide a grid layout setting method for multi device responsive page and computer-readable medium for performing the same, which enables a user to intuitively set a grid layout, which is the default layout of a screen configuration, through a graphical user interface for supporting multi-browser, multi-device, and multi-OS with OSMU (One Source Multi Use).

Other objectives of the present invention will be readily understood through the following description.

According to one aspect of the present invention, there is provided a grid layout setting method performing on a program development device configured for developing multi-device responsive page, including (a) executing a setting window for a grid layout according to user input, (b) confirming application of adaptive settings, (c) if the adaptive settings are applied as a result of the confirmation, displaying a plurality of grid layout setting screens for each multi-device within the setting window, (d) setting a plurality of first grid areas for a first device of the multi-devices within a first grid layout setting screen of the plurality of grid layout setting screens, and matching a plurality of group components corresponding to one grid item to each of the plurality of first grid areas, (e) setting a plurality of second grid areas for a second device of the multi-devices within a second grid layout setting screen of the plurality of grid layout setting screens, and matching a portion or all of the plurality of group components to each of the plurality of second grid areas and (f) upon completion of setting up the grid layout for the multi-devices, generating grid templates for each multi-device, wherein a responsive Page for the multi-devices is developed corresponding to the grid templates for each multi-device.

In (d), the first grid area may be set by selecting one of a plurality of grid cells corresponding to a default grid layout for the first device, or by integrating the plurality of grid cells by user manipulation via mouse input or touch.

In (e), the second grid area may be set by selecting one of the plurality of grid cells corresponding to a default grid layout for the second device, or by integrating the plurality of grid cells by user manipulation via mouse input or touch.

The plurality of group components matched to the first grid area in (d) may be defaulted as hidden items in the second device, and a portion of all of the plurality of group components defaulted as hidden items in (e) may be matched by user manipulation via mouse input or touch within the plurality of second grid regions.

The grid layout setting method may further include (g) displaying the grid template of the multi-device corresponding to a development screen resolution of the program development device among the multi-devices on the development screen, thereby enabling program development.

(g) may change the grid template displayed on the development screen to correspond to the development screen resolution that changes as a width of the development screen changes.

According to another aspect of the present invention, there is provided a non-transitory computer-readable medium storing computer executable instructions for performing a grid layout setting method when executed by a program development device configured for developing multi-device responsive page, including (a) executing a setting window for a grid layout according to user input, (b) confirming application of adaptive settings, (c) if the adaptive settings are applied as a result of the confirmation, displaying a plurality of grid layout setting screens for each multi-device within the setting window, (d) setting a plurality of first grid areas for a first device of the multi-devices within a first grid layout setting screen of the plurality of grid layout setting screens, and matching a plurality of group components corresponding to one grid item to each of the plurality of first grid areas, (e) setting a plurality of second grid areas for a second device of the multi-devices within a second grid layout setting screen of the plurality of grid layout setting screens, and matching a portion or all of the plurality of group components to each of the plurality of second grid areas and (f) upon completion of setting up the grid layout for the multi-devices, generating grid templates for each multi-device, wherein a responsive Page for the multi-devices is developed corresponding to the grid templates for each multi-device.

Other aspects, features and advantages other than those described above will become apparent from the following drawings, claims and detailed description of the invention.

According to an embodiment of the present invention, it is advantageous to enable a user to intuitively set a grid layout, which is the default layout of a screen configuration, through a graphical user interface for supporting multi-browser, multi-device, and multi-OS with OSMU

BRIEF DESCRIPTION OF ACCOMPANYING DRAWINGS

FIG. 16 illustrates the configuration of a system according to one embodiment of the present invention.

DETAILED DESCRIPTION

Figure 1:
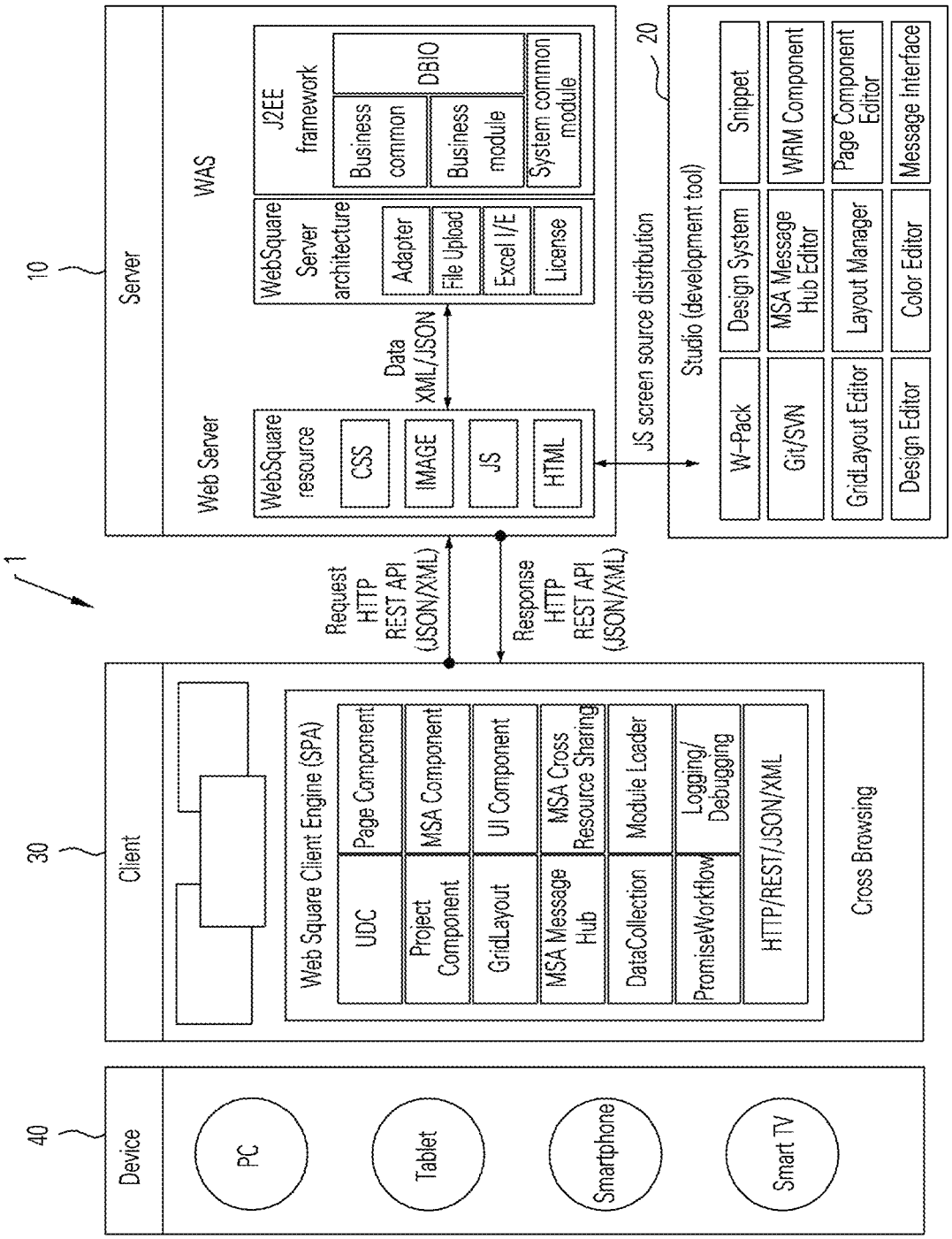
FIG. 1 illustrates the architecture of a user interface platform development system according to one embodiment of the present invention.

The invention can be modified in various forms and specific embodiments will be described below and illustrated with accompanying drawings. However, the embodiments are not intended to limit the invention, but it should be understood that the invention includes all modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

As used herein, a "unit" includes a unit realized by hardware, a unit realized by software, and a unit realized by both. Further, one unit may be implemented using two or more hardware, or two or more units may be implemented using one hardware. In addition, the term "unit" is not meant to be limited to software or hardware, and the "unit" may be configured to reside on an addressable storage medium or may be configured to execute one or more processors. Thus, in one example, "~unit" may include components, such as software components, object-oriented software components, class components, and task components, processes, functions, properties, procedures, subroutines, segments of program code, drivers, firmware, microcode, circuits, data, databases, data structures, tables, arrays, and variables. The functionality provided within the components and "~units" may be combined into fewer components and "~units" or further separated into additional components and "~sub-units". In addition, the components and "~units" may be implemented to run one or more CPUs in the device.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

FIG. 1 illustrates the architecture of a user interface platform development system according to one embodiment of the present invention.

The user interface platform development system 1 according to one embodiment of the present invention supports various smart device and web browser environments of clients, and the server environment supports platform independence for any web application server (WAS) supporting Java 2 Enterprise Edition (J2EE), any framework, any operating system (OS), and the like.

Hereinafter, the user interface platform development software according to one embodiment will be referred to as WebSquare developed and marketed by the present applicant.

The user interface platform development system 1 may include a client 30 used by a user, a development tool 20 used by a developer (sometimes referred to as a "studio"), and a server 10 that responds to requests from the client 30 and enables the development tool 20 to develop WebSquare screen files.

The development tool 20 may provide an environment in which developers can develop WebSquare screen files related to business systems. A client engine may be installed in the client 30, and the client engine may display the WebSquare screen file in the browser.

Client 30 may be written in JavaScript and based on AJAX architecture. It supports dynamic execution of UI components such as grids, charts, etc. It may include utilities for communication and other UI related functions.

The client engine contained in the client 30 may have a Single Page Application (SPA) architecture.

The client engine may include modules such as UDC, Page component, Project component, MSA component, grid layout, UI component, MSA message hub, cross-MSA resource sharing, data collection, module loader, promise workflow, logging/debugging, etc.

Components are basic files that can be used to develop Pages, Project UDCs, MSA UDCs, UDCs, and TTCs. All screens in the business system can be composed of structured components to support efficient operation that can be reused anywhere.

WebSquare Page component is a basic screen file used in component form. Newly added Project UDC, MSA UDC, UDC, and TTC are supported. XML is used as the extension.

UDC stands for User Defined Component, which is registered to a palette in the studio.

TTC stands for Trust Third-part Component and supports the use of external solutions as WebSquare Page components.

Project UDC is a common function file that contains common functions used throughout the Project. It is defined in a WebSquare environment setting and is automatically loaded when a WebSquare engine is loaded.

MSA UDC is a common function file that contains common functions to support micro-frontends. It is defined in the WebSquare environment setting and loads resources from the server where the microservice is running when the corresponding WebSquare engine is loaded.

Components may include built-in components, SP4 UDC components, and WebSquare components.

GridView is a built-in component, and may include Grid, Table, Combo, Input, and TabControl. This component is provided by default in WebSquare.

SP4 UDC components may include SP4 UDC and SPC TTC. As a user-defined component standard, the SP4 UDC can be added by a developer on his own. And SPC TTC is a TTC which an component product is added through collaboration with solution manufacturers.

WebSquare component may include UDC, TTC, Project UDC, and MSA UDC. UDC and TTC are Page-based user-defined components introduced to increase the reusability of UI elements (Pages) developed by developers. All Pages can be developed as components by simplifying/structuring existing Pages (XML). They can be modularized by lowering the degree of coupling between Pages.

A Project UDC is a global UDC, a component that can be called from any screen. It can be used to develop common task UDCs to maximize reuse.

MSA UDC is a UDC for micro frontend implementation, which applies MSA and enables cross-domain processing.

Data Collection is a module for intuitive, consistent, and convenient data management in the form of tables. It provides an API similar to the Grid component, allowing developers to easily manipulate data in a grid format.

Promise Workflow makes programming asynchronous processing simple and easy with an intuitive GUI that makes it less complicated and difficult to develop with HTML5.

The Server 10 stores application resources (images, HTML, JS, CSS, XML, etc.). The server architecture may include utilities for adapters, file upload/download, Excel I/E (import/export), license management, and so on. It may also include modules for framework interface such as business common, business module, DBIO, and system common.

The server 10 may be implemented independently of the OS, DBMS, and WAS to support platform independence.

Development Tool 20 provides a WYSIWYG-style integrated development environment and can support developers for easy development. A developer can draw components, add scripts, view screens, debug, etc. all at once through the development tool 20.

In addition, the development tool 20 may perform SCM (Software Configuration Management) using SVN/CVS/Git, etc. Commercial configuration management solutions can interoperate as vendor plug-ins provided by vendors.

Development tool 20 may include modules such as a W-Pack (source compiler), a design system, Snippet, Git/SVN, MSA message hub editor, WRM component, a grid layout editor, a layout manager, a Page component editor, a design editor, a code editor, a message interface, and so on. It also supports a reusable common business UDC.

When a client 30 installed on various devices (PCs, tablets, smartphones, smart TVs, etc.) makes a request (HTTP REST API (JSON/XML)) to a server 10, a web server can locate resources, exchange data with a web application server and send a response (HTTP REST API (JSON/XML)) corresponding to the request to the client 30. In the connection between the web server 10 and the development tool 20, JS screen sources may be distributed.

In one embodiment, a micro frontend architecture with MSA message broker and cross-MSA resource sharing capability may be provided to correspond to the microservice architecture (MSA).

In addition, it is possible to improve performance through Single Page Application (SPA), engine optimization (Engine Optimizer), resource optimization (W-Pack), support for processing large amounts of data, etc.

Through its open architecture, it can support any web application server, any framework, any OS, and improve development productivity through open source reuse. It also supports easy integration of various open/commercial libraries and supports integration with various security solutions.

Figure 2:
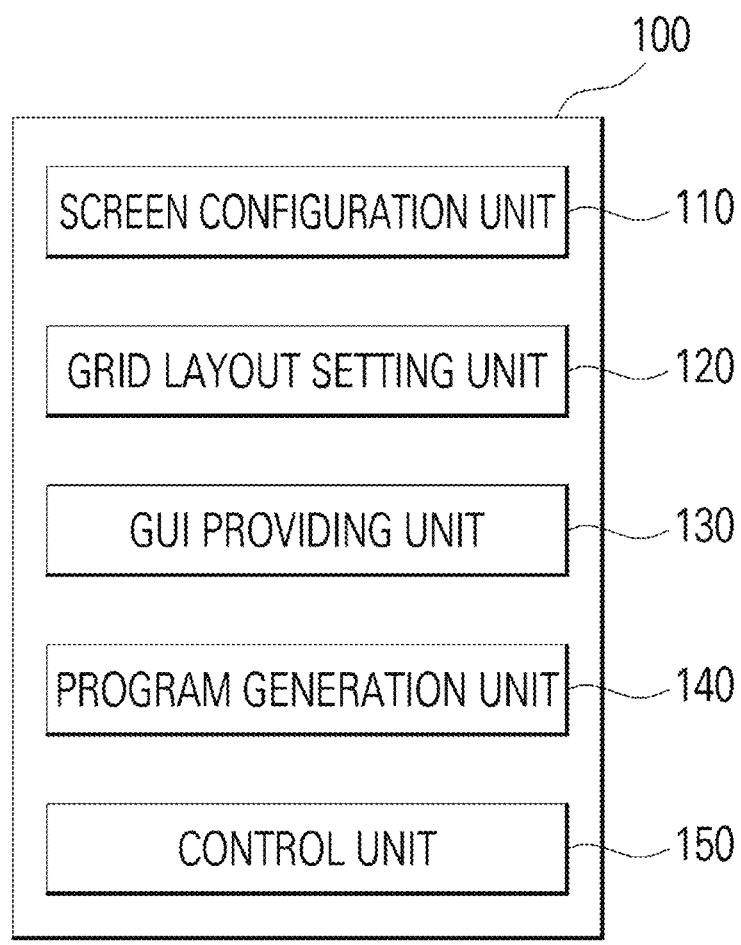
FIG. 2 is a block diagram of a program development device according to one embodiment of the present invention.
Figure 3:
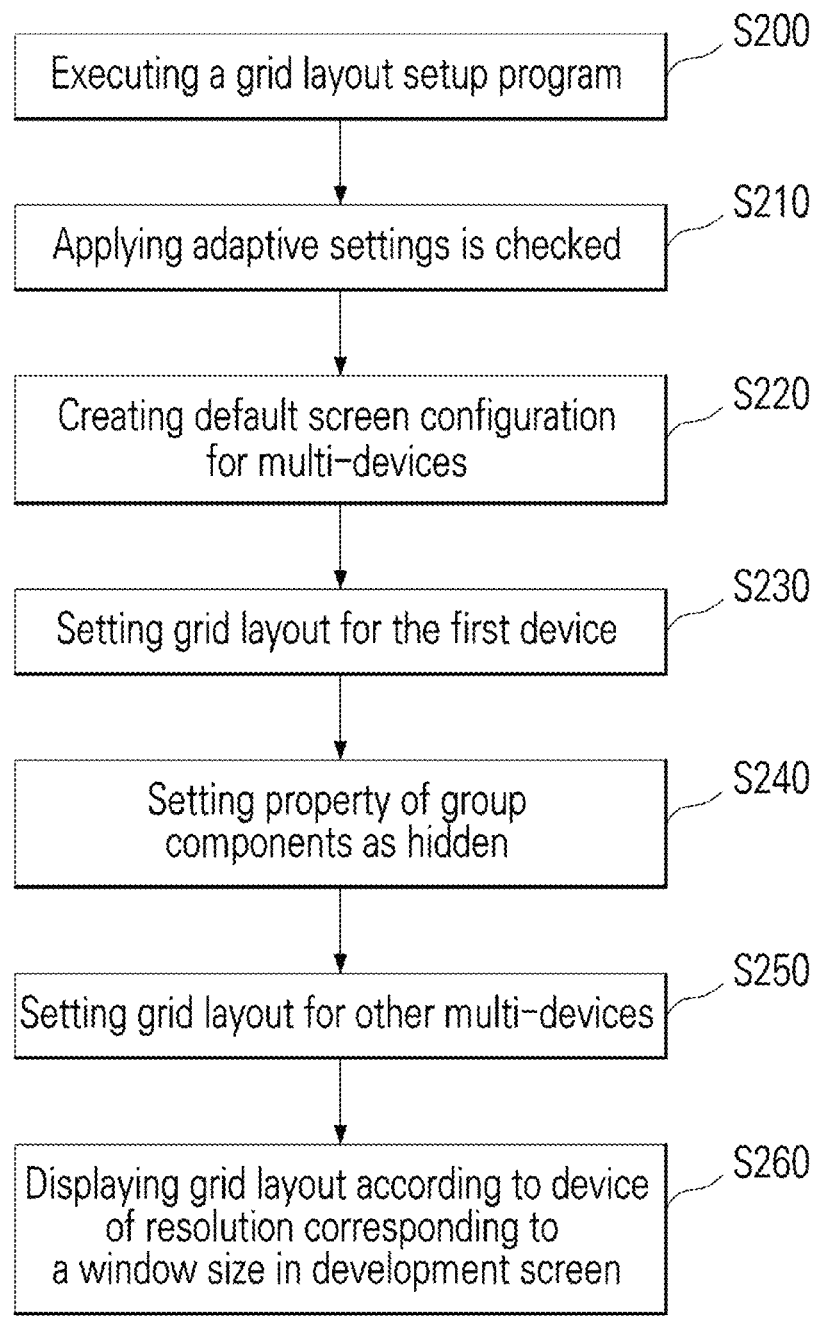
FIG. 3 is a flowchart of a grid layout setting method according to one embodiment of the present invention.
Figure 4:
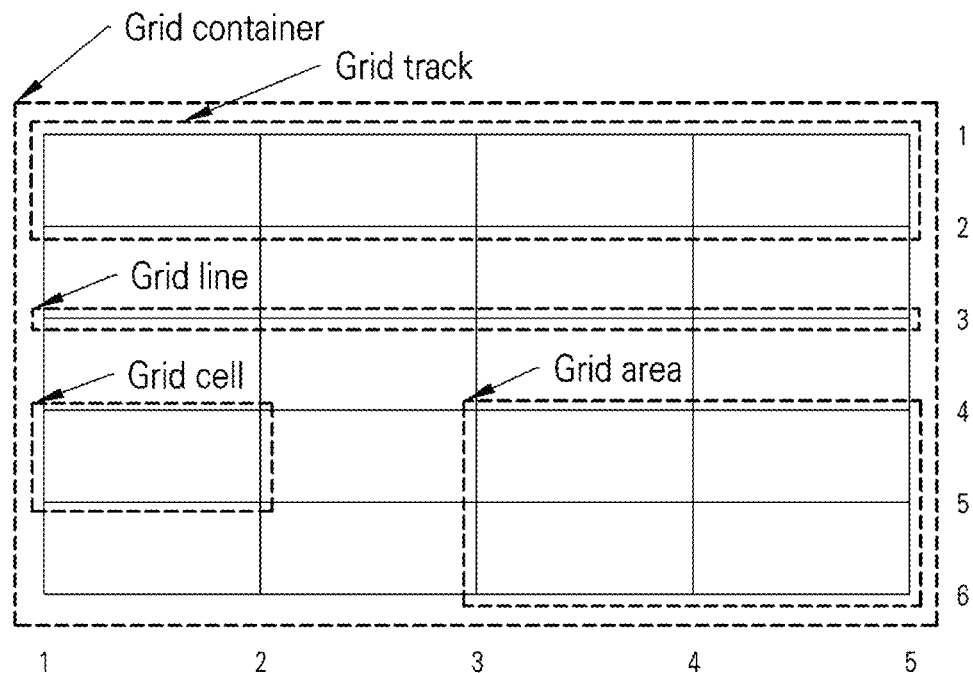
FIG. 4 illustrates a configuration of a grid.
Figure 5:
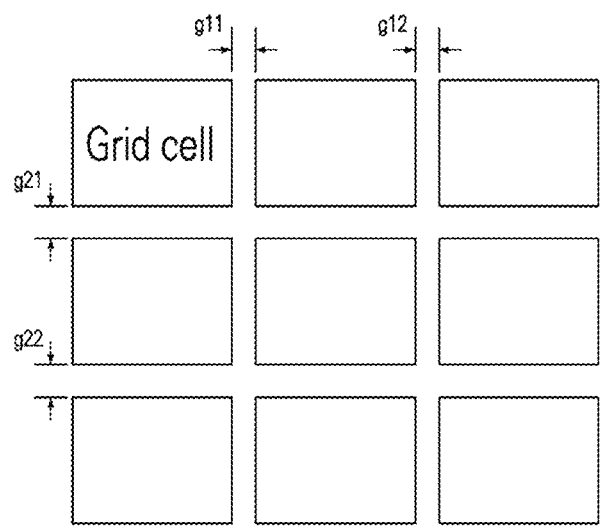
FIG. 5 illustrates a grid gap.

FIG. 2 is a block diagram of a program development device according to one embodiment of the present invention, FIG. 3 is a flowchart of a grid layout setting method according to one embodiment of the present invention, FIG. 4 illustrates a configuration of a grid, FIG. 5 illustrates a grid gap, and FIGS. 6 through 11 are example screens of a grid layout setting window.

A program development device according to one embodiment of the present invention is software used by a developer to develop a program, corresponding to the development tool described above. A graphical user interface (GUI) enables editing operations such as intuitively creating, selecting, moving, resizing, reordering, and/or changing parents of object.

An object according to one embodiment is a component that is graphically placed in a specific location on the screen during program development. For example, it can be a button, a list box, a combo box, an edit box, a grid, a table, a scroll view, a window, and so on. A child object can be an object that is positioned by being placed on a parent object.

In particular, the embodiment improves usability for publishers or developers by allowing them to easily design relative coordinates or responsive Pages when selecting the grid layout component among objects to draw on Page first.

Referring to FIG. 2, the program development device 100 according to one embodiment may include a screen configuration unit 110, a grid layout setting unit 120, a GUI providing unit 130, a program generation unit 140, and a control unit 150.

The screen configuration unit 110 is configured for configuring a screen (development screen) of the program development device that is output to the display unit in the user terminal. If the content to be displayed is larger than the screen, scrolling may be used to display the content.

A user terminal is a general-purpose or specialized computing device such as a hand-held PC, a notebook computer, a laptop computer, a pad, a server, or a smartphone, and may perform certain computational operations by being equipped with a microprocessor capable of performing multimedia playback functions.

Additionally, when developing a program according to one embodiment, the user terminal may be preloaded or downloaded over the network with an application or equivalent functional program module that provides a method for setting the grid layout.

The display unit of the user terminal can be LCD, OLED, CRT, 3D display, and other flexible displays, which can output graphic information such as images and text.

The display unit of the user terminal according to one embodiment may include functions such as screen zoom-in, zoom-out, screen navigation, scrolling, and so on.

Content to be displayed on the screen of the user terminal may be preloaded in the program development device or downloaded from the Internet via network through a network connection.

Additionally, the display unit of the user terminal may be implemented as a touch screen, in which case a touch information processing unit can sense the touch point on the screen and process event information occurring at that point.

The grid layout settings unit 120 is configured for providing setting window for creating and modifying grid layout components for the configuration of Page corresponding to the screen of the device on which the development program is to be executed, allowing the user to easily set up a grid layout for responsive Page that reflects relativity for different types of devices (hereinafter, collectively referred as multi-devices) with simple operations. For example, the setting window can be represented in the form of a pop-up window.

The screen of the program developed by the program development device according to one embodiment may be implemented as a grid divided into a plurality of groups. Each compartmentalized grid area of the grid may belong to one of the groups. Any one group may include at least one or more grid areas.

The grid layout setting unit 120 may be configured for creating a grid layout to be applied separately for each device depending on the type of multi-device on which the program currently under development will be executed. In this case, the same group on different devices can be interoperated so that the same objects are placed in the same group and display the same content.

The GUI providing unit 130 may be configured for graphically providing the program development device to the user.

The program generation unit 140 may be configured for creating an executable file by compiling the program developed according to the set grid layout.

The control unit 150 is configured for controlling the screen configuration unit 110, the grid layout setting unit 120, the GUI providing unit 130, and the program generation unit 140 described above to perform their respective functions while interoperating with each other.

Referring to FIG. 4 and FIG. 5, the main components are shown in the grid that makes up the program screen.

A grid is a screen configuration component that includes a plurality of grid cells bounded by horizontal and vertical grid lines.

A grid container is a parent element of all grid items.

A grid item is a child element of the grid container.

Grid lines are dividing lines that make up the grid.

A grid track is the space between two grid lines, which can be either a column or a row of the grid.

A grid cell is the smallest structural unit of a grid.

A grid area is the space bounded by four grid lines and can consist of any number of grid cells.

A grid number is the number of each grid line.

A grid gap is the spacing between grid cells (see FIG. 4).

Each grid cell itself, or grid area where two or more grid cells are integrated, is grouped into a group with a property, and one or more objects can be placed within each group. An placement of a plurality of groups within a grid of multiple cells is referred to as the grid layout. One group may correspond to one grid item.

In one embodiment, to be smoothly applicable to multi-devices with different screen resolutions, developers can intuitively edit and set the grid layout for each multi-device in one single dialog window.

The properties of the grid container are shown in the following table.

TABLE 1

| Property | Description |
| --- | --- |
| display | Define grid container |
| grid-template-rows | Define the size of explicit row (Track) |
| grid-template-columns | Define the size of explicit column (Track) |
| grid-template-areas | Create a template by referencing an area name |
| grid-template | Shortened property of grid-template-xxx |
| row-gap(grid-row-gap) | Define spacing (line) between rows |
| column-gap (grid-column-gap) | Define spacing (line) between columns |
| gap(grid-gap) | Shortened property of xxx-gap |
| grid-auto-rows | Define the size of implicit row (Track) |
| grid-auto-columns | Define the size of implicit column (Track) |
| grid-auto-flow | Define the auto-placement algorithm scheme |
| grid | Shortened properties for grid-template-xxx and grid-auto-xxx |
| align-content | Align grid contents vertically (column axis) |
| justify-content | Aligning grid contents horizontally (row axis) |
| place-content | Shortened properties for align-content and justify-content |
| align-items | Align grid items vertically (column axis) |
| justify-items | Align grid items horizontally (row axis) |
| place-items | Shortened properties for align-items and justify-items |

In order to set the grid layout, coding is required to individually specify the values of each property listed in the table above. In addition, the grid layout coded in this way is dependent on one single device, so when a different grid layout is to be applied to devices with different display resolutions, it is inconvenient to code completely new. Therefore, in one embodiment, the developer can simply set the grid layout specified for each multi-device in one single setting window without separate coding by using a mouse or touch operation, and can easily check the same group components that are interoperated between the multi-devices.

It is difficult to make intuitive selections when setting a grid layout using conventional program development devices, and it is inconvenient to directly input each property value of a grid element to set the grid layout. However, according to one embodiment, settings such as creating and editing a grid layout can be easily and freely performed by intuitive user input such as mouse click/dragging or touch processing through a graphical user interface, thereby improving the efficiency and productivity of responsive Page production work.

Referring to FIG. 3, a method of setting up a grid layout is illustrated, and FIGS. 6 through 11 illustrate the process of setting up a grid layout through the setting window.

The grid layout setting unit 120 is configured for executing a grid layout setup program in response to user input (step S200). The program execution may launch a setup window 300 where a developer can enter commands.

Applying adaptive settings is checked (step S210). If adaptive is applied, it can enable the development of adaptive or Responsive Pages with which one or more of multi-devices can interoperate.

Applying adaptive settings may be left unchecked by default. And when applying adaptive settings is checked by user input, the layout defined in a media item of config.xml can be expressed in the setting window 300. In one embodiment, it is assumed that three types of devices such as desktop, tablet, and mobile are defined in the media item.

The grid layout setting screen represents the page configuration for the multi-device defined in the media item, the number of grid layout setting screens is equal to the number of multi-devices, and can be displayed consecutively within the setting window (Step S220). As described above, multi-devices may include one or more of desktops, tablets, and mobile devices, and setting units 310a, 310b, 310c for each device may be displayed in the setting window 300.

By setting the rows, columns, grid spacing, etc. of the grid layout for each of the multi-devices, a default grid layout configuration can be created. For m rows and n columns, the default grid layout configuration with m×n grid cells is created.

Figure 6:
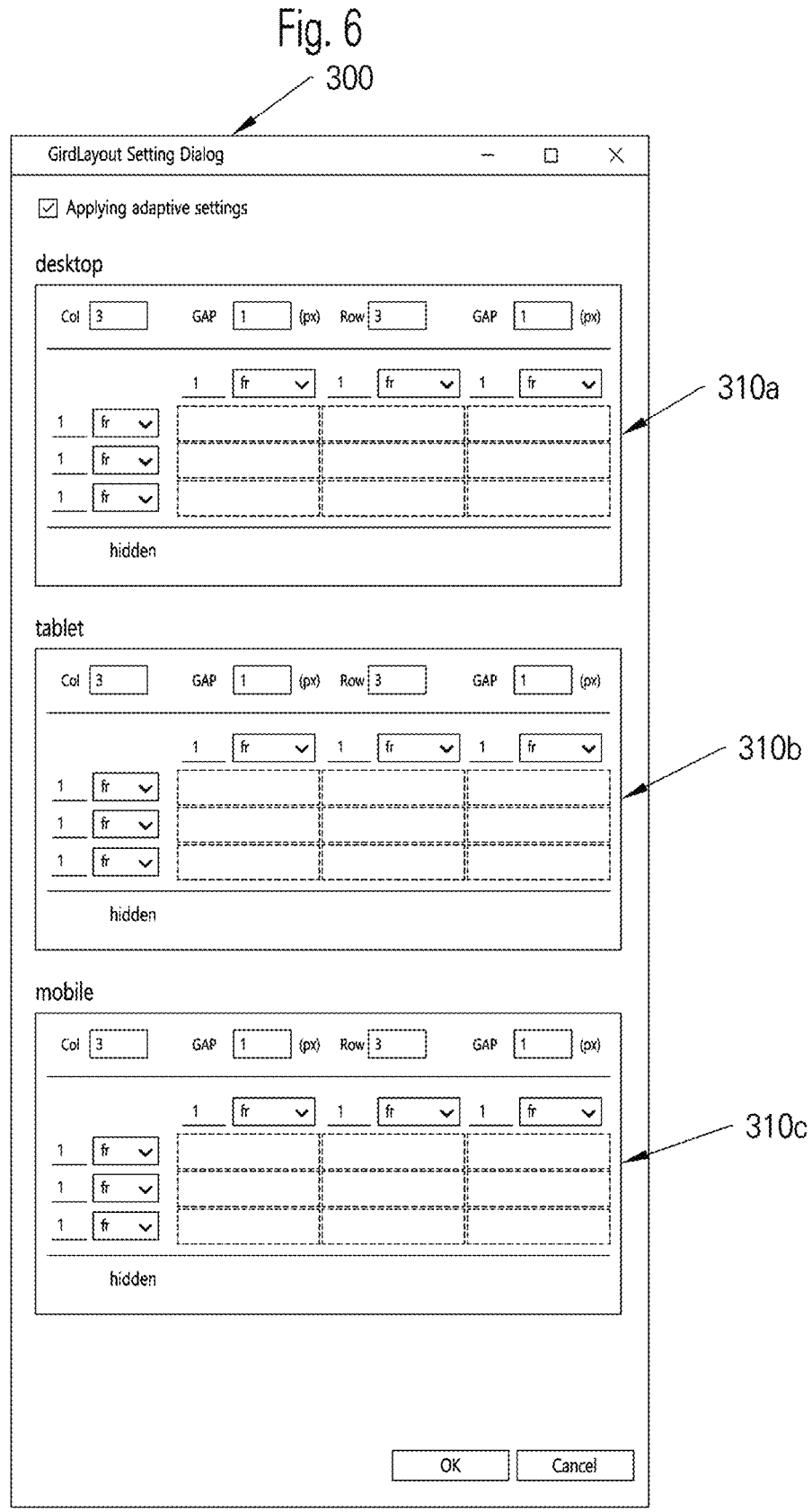
FIG. 6, FIG. 7, FIG. 8, FIG. 9, FIG. 10 and FIG. 11 are example screens of a grid layout setting window.

FIG. 6 illustrates a default grid layout with 3×3 configuration for all multi-devices by default.

A fr is a flexible unit suitable for maintenance and is used when the container size is not fixed but it is necessary to specify the item size as a percentage.

The fr (fraction or space fraction) unit represents a percentage of available space.

For example, if a column is specified as [2fr 1fr 1fr;], a space is divided into four columns (2+1+1=4), with the first column taking ²⁄₄, the second and third columns taking ½ each. If a container width is 1,000 px, each width will be 500 px, 250 px, and 250 px, respectively. If a container width is not fixed, the browser will resize the items accordingly.

Figure 7:
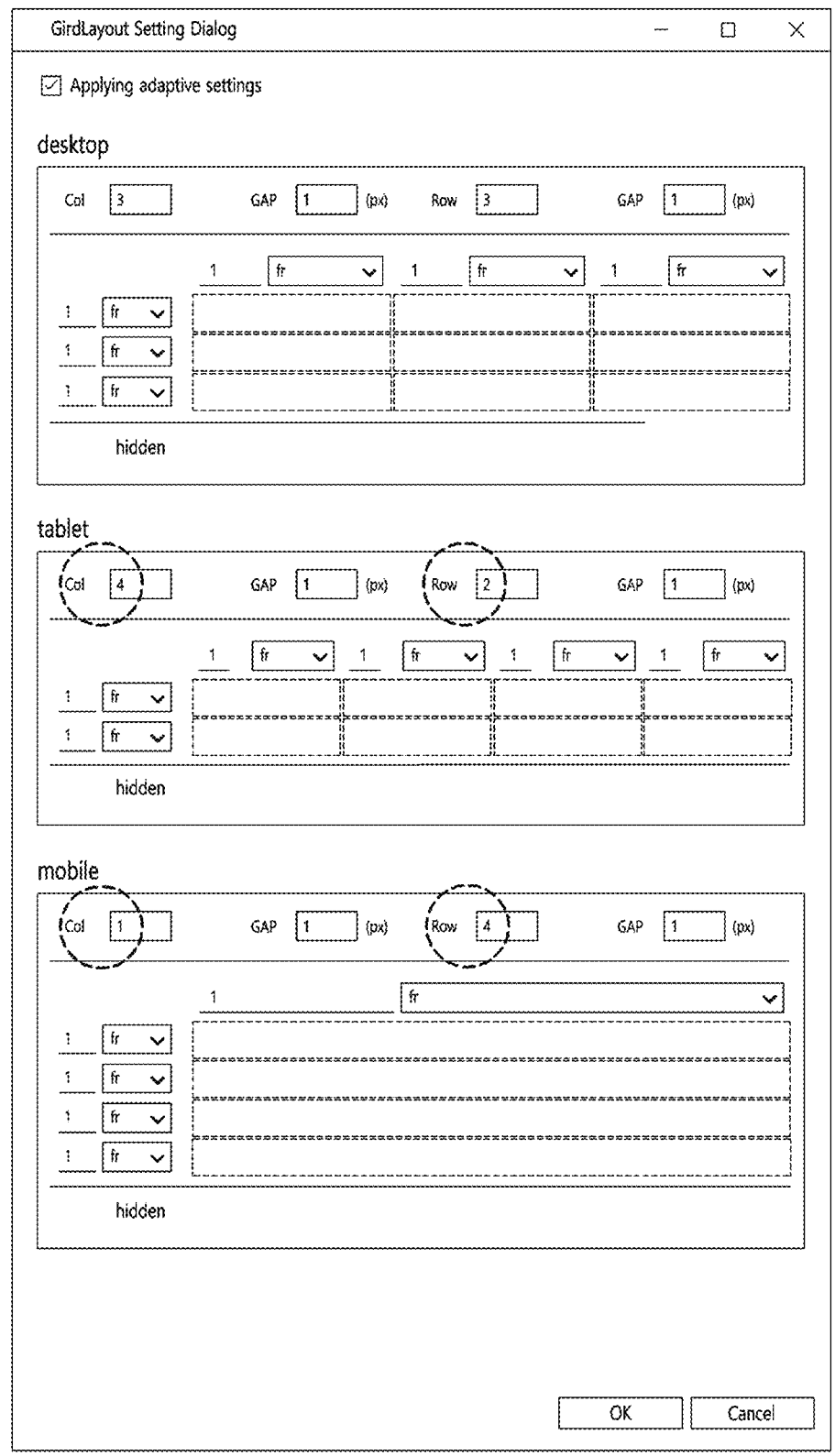
Figure 8:
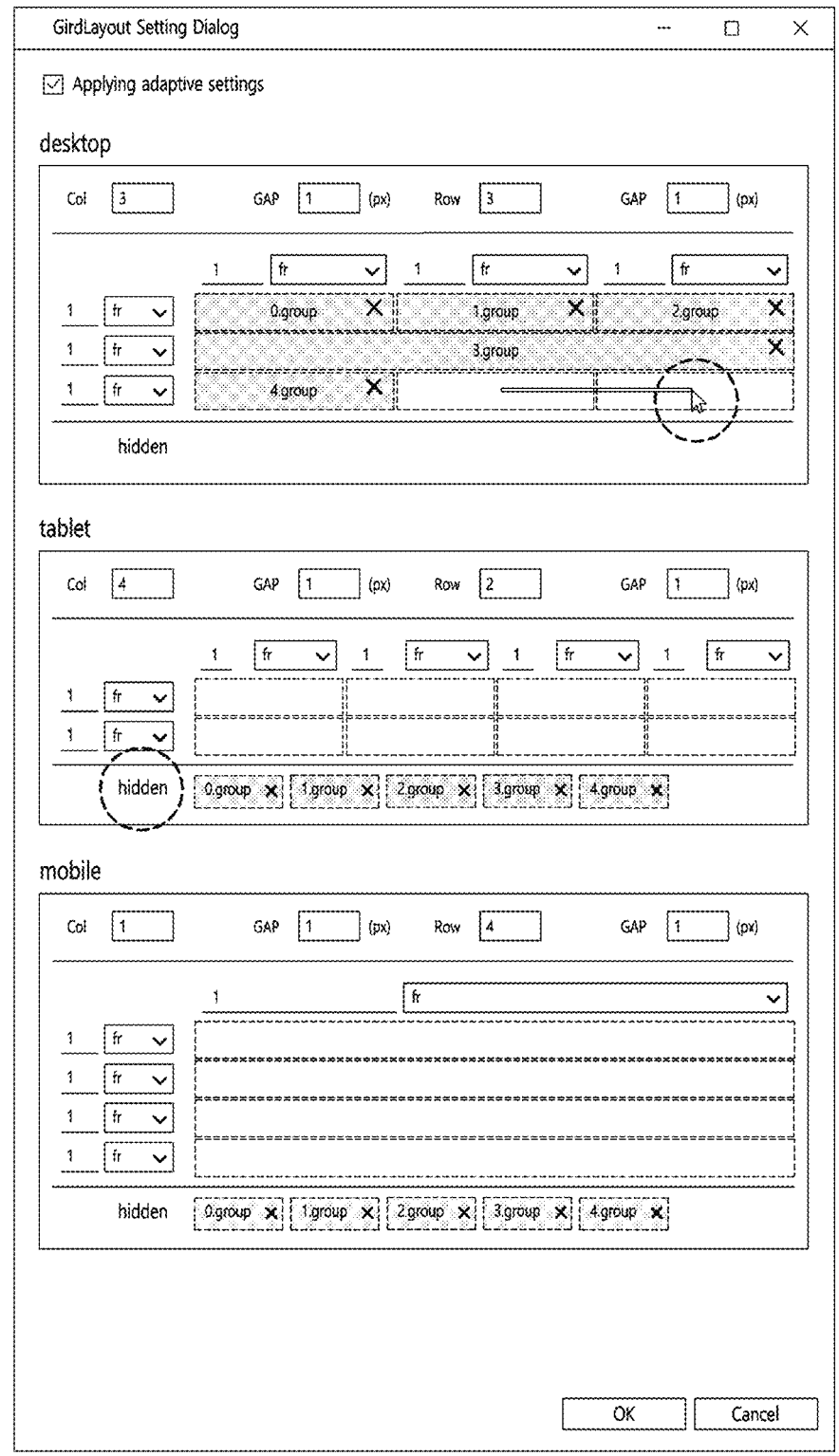

FIG. 7 illustrates that the default grid layout with 3×3 configuration is changed to a 2×4 configuration for tablets and to a 4×1 configuration for mobile, respectively.

Next, a group that matches one grid item for one grid cell or a grid area that integrates two or more grid cells, both being selected for the first device, is set up (S230)

Selection of one grid cell can be done by double-clicking the mouse or by touch input on an empty cell. The selected grid cell can be specified as a group component.

Integration of two or more grid cells can be done by mouse click-and-drag or touch-and-drag. Alternatively, by expanding the size of grid area by manipulating a resize handler for the grid area displayed around the grid cells that are selected using mouse click-and-drag or touch-and-drag, other neighboring grid cells are contained within the expanded grid area, causing the grid cells contained within that grid area to be integrated and designated as one single group component (see FIG. 8).

When multiple group components are set for the first device, the same components as the multiple group components set for the first device can be set as hidden items by default on other devices. A hidden item represents a group component that has properties that are not displayed on that device.

Group components placed in a hidden item can be placed in a grid area consisting of one single grid cell or a grid area that integrates two or more grid cells in a specified manner, allowing the placement of that group component to be determined on the device.

Figure 9:
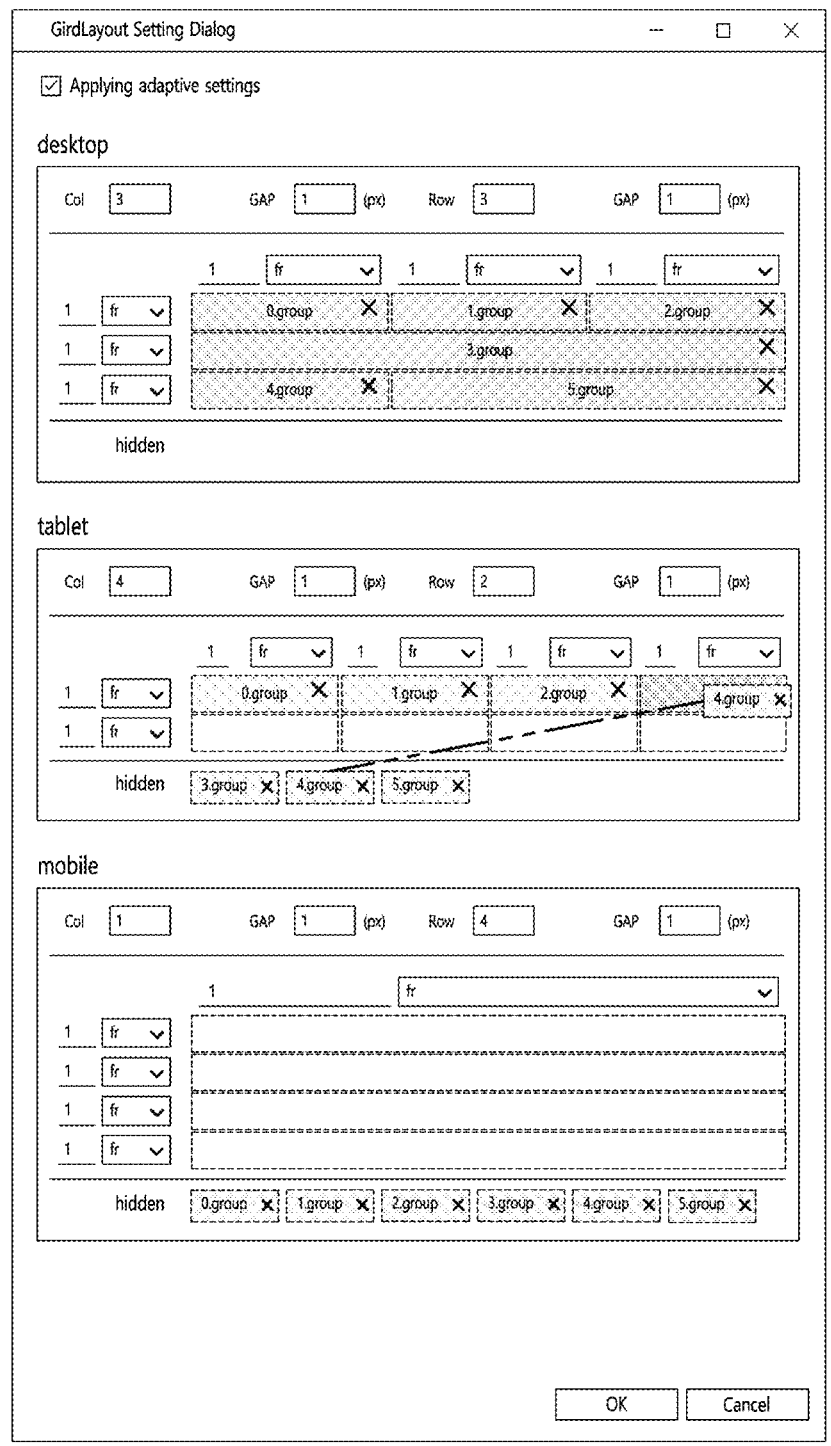

Referring to FIG. 9, in the case of a tablet, among group 0 to group 5, group 0, group 1, group 2 and then group 4 can be placed in row 1. In this case, the grid layout configuration can be done by selecting a component corresponding to the group 4 and dragging it to the grid cells where the component is placed.

Figure 10:
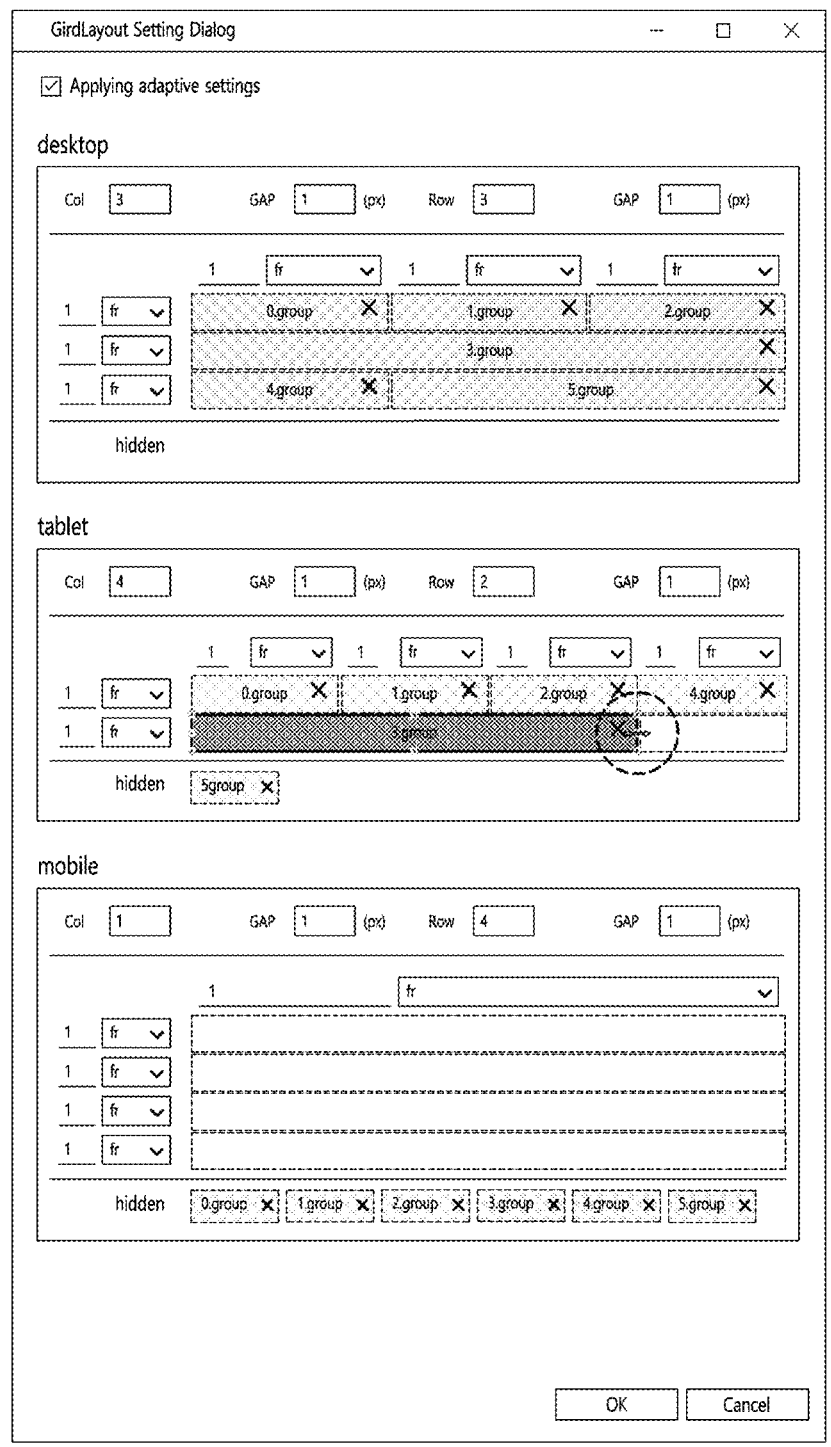
Figure 11:
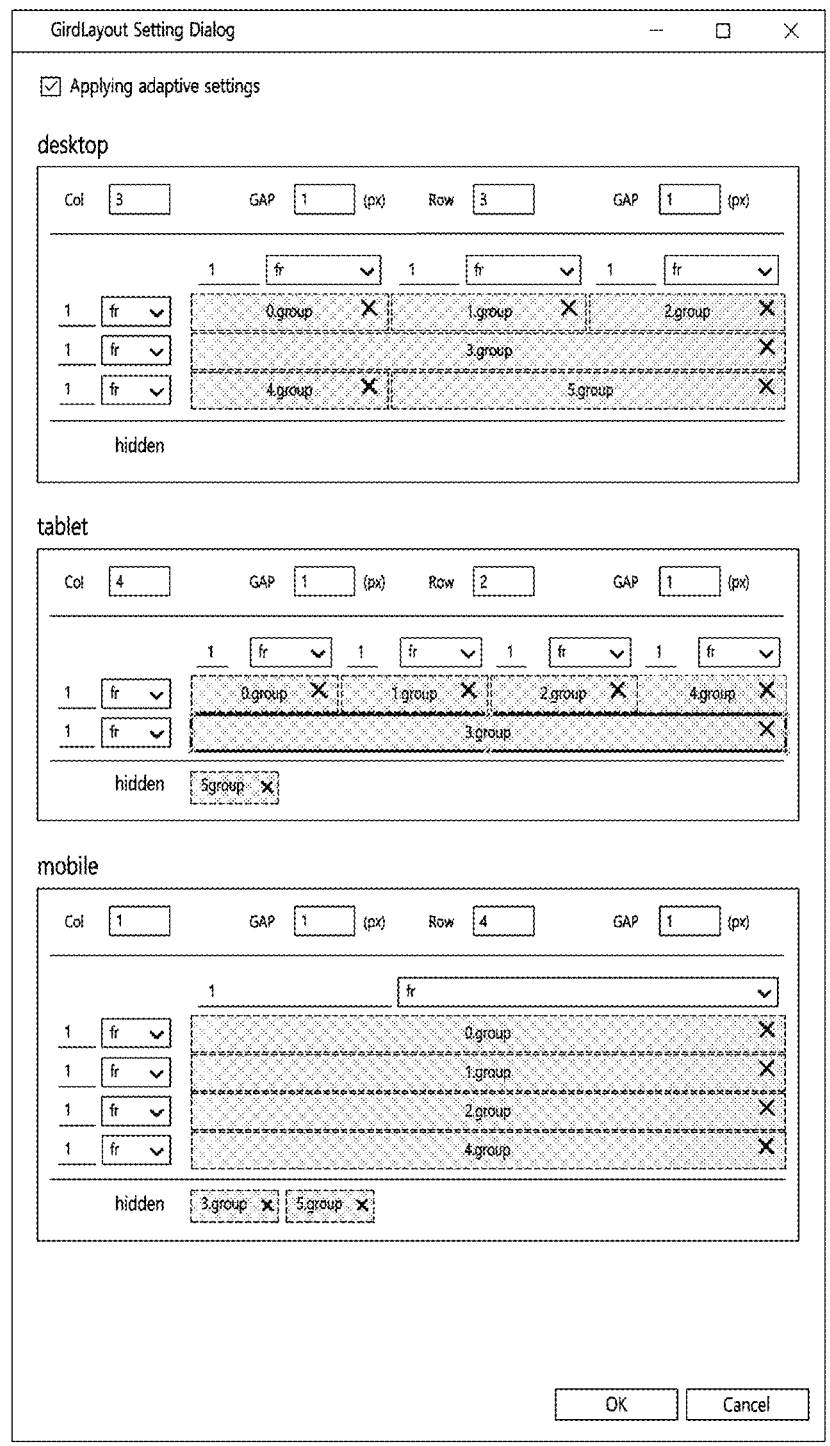

Referring to FIGS. 10 and 11, group 3 may be placed in row 2, but may be matched in a grid area that incorporates a plurality of grid cells. In this case, the resize handler of the grid area can be manipulated to resize the grid area that group 3 is matched to.

After the placement is complete, any group components that remain in the hidden items become group components that are set not to be displayed on that device.

Once the designation of the grid area for each multi-device and the placement of group components are completed, grid templates can be created for each multi-device.

In the grid templates for each multi-device, group components with the same number represent the same content, and can be adaptively placed to reflect the characteristics of each of multi-devices.

In one embodiment, as shown in FIG. 11, the relative coordinates of group components can be set for a plurality of multi-devices in one single setting window, to facilitate the development of responsive Pages.

Figure 12:
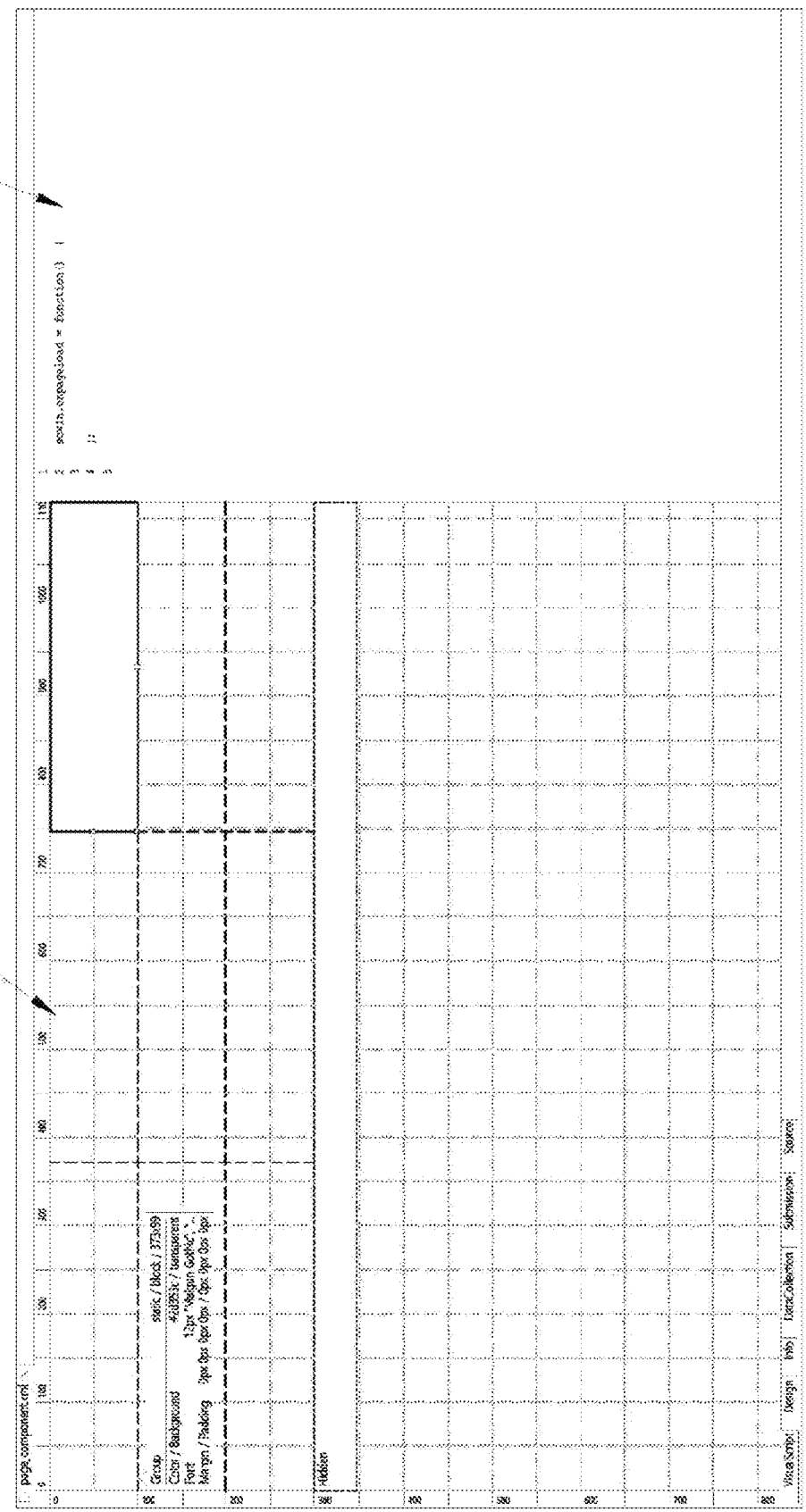
FIG. 12 illustrates a default development screen where a grid layout is displayed on a program development device to perform page screen development.
Figure 13:
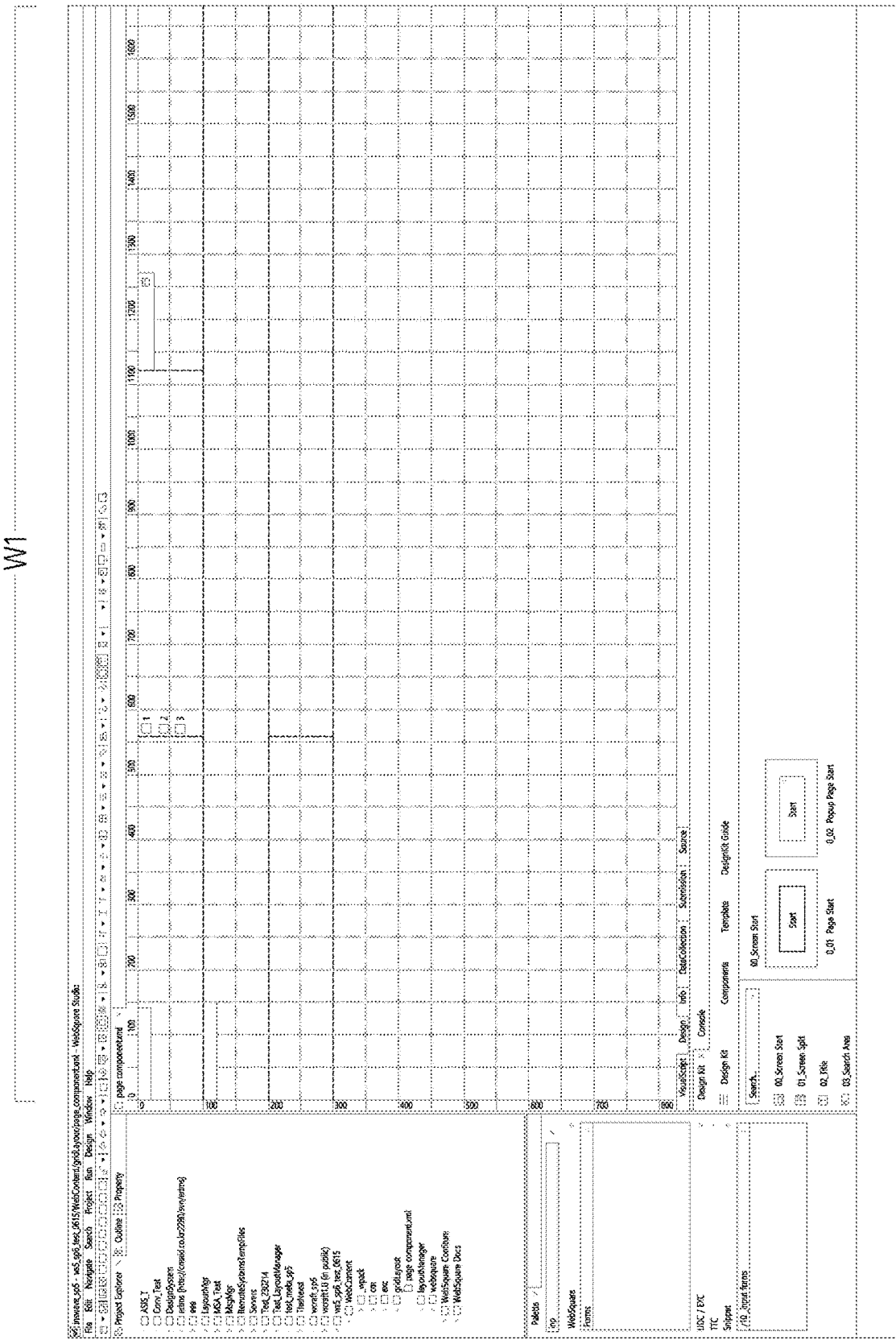
FIG. 13, FIG. 14 and FIG. 15 illustrate adaptive grid layout changes that are displayed based on the size of the development screen when the grid layout for multi-devices is set by the setting window.
Figure 14:
Figure 15:
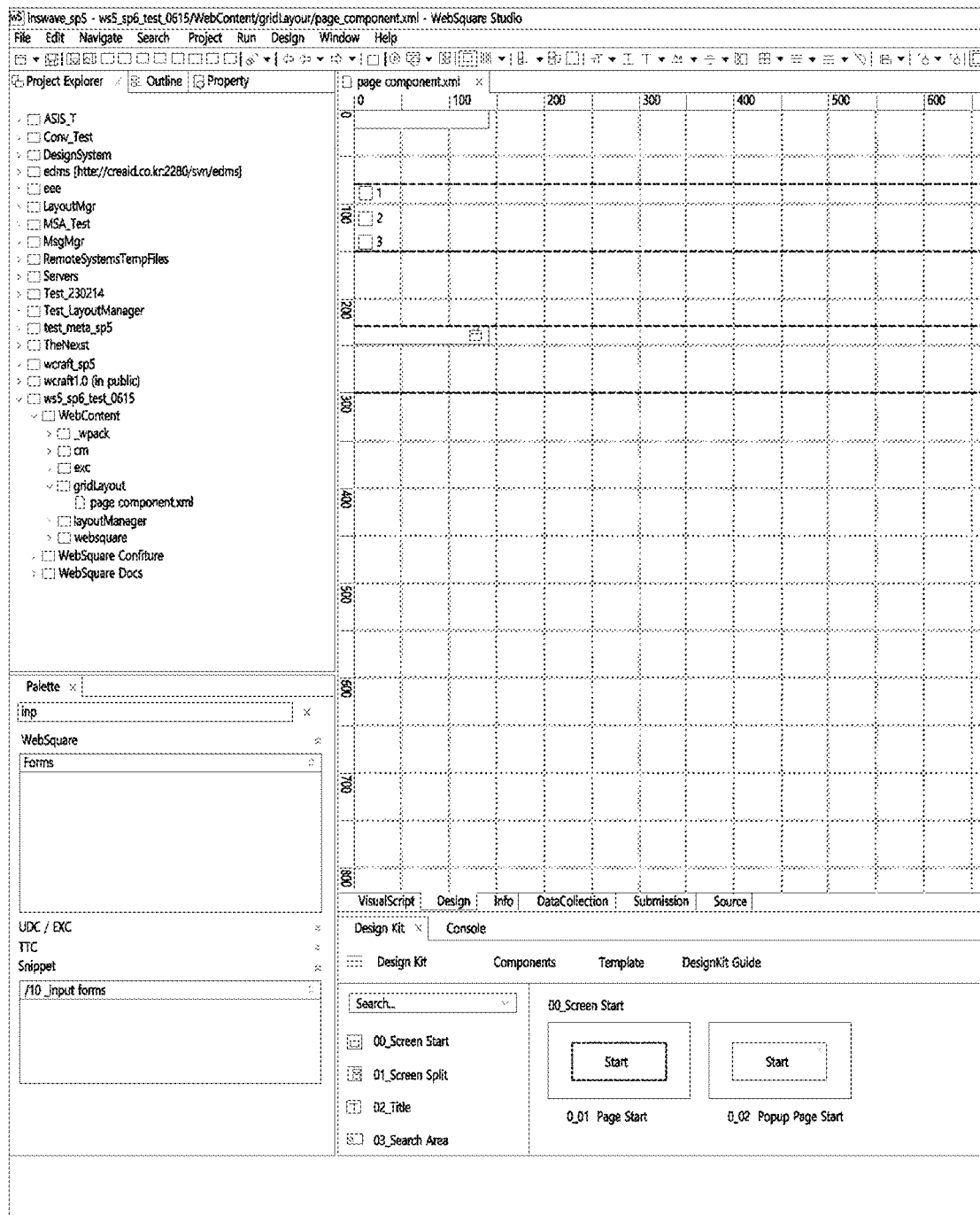

FIG. 12 illustrates a default development screen where a grid layout is displayed on a program development device to perform page screen development, and FIG. 13, FIG. 14 and FIG. 15 illustrate adaptive grid layout changes that are displayed based on the size of the development screen when the grid layout for multi-devices is set by the setting window.

Referring to FIG. 12, the program development device 100 displays the default grid layout configuration of Page that the user (publisher or developer) wants to develop on the development screen.

In FIG. 12, a case with a 3×3 configuration is illustrated. Page of a program can be developed by placing objects such as buttons, list boxes, combo boxes, edit boxes, tables, scroll views, and windows within each displayed grid cell.

On the right, a script corresponding to the code for the currently displayed development screen may be displayed.

In case that the grid templates for each multi-device have been completed through the grid layout setting unit 120, the grid layout for the multi-device grid template corresponding to the resolution of the development screen can be displayed on the screen when the developer opens the development screen via the program development device 100.

In FIG. 13, since the development screen has a width of W1 and corresponds to the desktop, a grid layout with a [3; 1; 2] configuration that corresponds to the desktop is shown.

In FIG. 14, since the development screen has a width of W2 and corresponds to the tablet, a grid layout with a [4; 1] configuration that corresponds to the tablet is shown.

In FIG. 15, since the development screen has a width of W3 and corresponds to the mobile, a grid layout with a [1; 1; 1; 1] configuration that corresponds to the mobile is shown.

By simply adjusting the width of the development screen (e.g., by mouse dragging or touch dragging), the grid template displayed within the development screen is automatically adjusted to match the multi-device corresponding to the resolution of the development screen, allowing users to easily visualize and refine the results of the responsive Page currently under development.

FIG. 16 illustrates the configuration of a system according to one embodiment of the present invention.

Referring to FIG. 16, the program development device 100 may include a processor 510 and a memory 520. The memory 520 may store one or more instructions executable by the processor 510. The processor 510 may execute the one or more instructions stored in the memory 520. By executing the instructions, the processor 510 can perform one or more of the operations described above with reference to FIGS. 3 through 15. Additionally, a configuration of the present invention described above with reference to FIG. 2 may be a configuration implemented by instructions executed by the processor 510.

The aforementioned embodiments may be realized by a hardware component, a software component, and/or a combination of hardware and software components. For example, the device and components described in the embodiments may be realized using one or more general-purpose computers or special-purpose computers such as, for example, a processor, a controller, a central processing unit (CPU), a graphics processing unit (GPU), an arithmetic logic unit (ALU), a digital signal processor, a microcomputer, a field programmable array (FPA), a programmable logic unit (PLU), a microprocessor, an application specific integrated circuits (ASICS) or other devices implementing instructions and responding thereto.

The aforementioned grid layout setting method may also be implemented in the form of a recording medium including computer-executable instructions, such as an application or program module executed by a computer. The computer-readable medium can be any available medium that can be accessed by a computer, and includes both volatile and non-volatile media, and removable and non-removable media. Further, the computer-readable medium may include a computer storage medium. The computer storage medium includes both volatile and non-volatile, removable and non-removable media implemented with any method or technology for storing information such as computer-readable instructions, data structures, program modules, or other data.

The aforementioned grid layout setting method may be executed by an application installed by default on the terminal (which may include programs included in platforms or operating systems that are basically installed in the terminal), or it may be executed by an application (i.e., a program) installed by the user directly on the master terminal through an application delivery server, such as an application store server, an application or a web server associated with such a service. In this sense, the aforementioned grid layout setting method may be implemented by an application (i.e., a program) installed by default on the terminal or installed directly by the user, and recorded on a computer-readable recording medium such as the terminal.

While the invention has been described above with reference to exemplary embodiments, it will be understood by those skilled in the art that the invention can be modified and changed in various forms without departing from the concept and scope of the invention described in the appended claims.

What is claimed is:

1. A grid layout setting method performing on a program development device for developing multi-device responsive page, comprising:
   (a) executing a setting window for a grid layout according to user input;
   (b) confirming application of adaptive settings;
   (c) if the adaptive settings are applied as a result of the confirmation, displaying a plurality of grid layout setting screens for each multi-device within the setting window;
   (d) setting a plurality of first grid areas for a first device of the multi-devices within a first grid layout setting screen of the plurality of grid layout setting screens, and matching a plurality of group components corresponding to one grid item to each of the plurality of first grid areas;
   (e) setting a plurality of second grid areas for a second device of the multi-devices within a second grid layout setting screen of the plurality of grid layout setting screens, and matching a portion or all of the plurality of group components to each of the plurality of second grid areas; and
   (f) upon completion of setting up the grid layout for the multi-devices, generating grid templates for each multi-device,
   wherein a responsive page for the multi-devices is developed corresponding to the grid templates for each multi-device,
   wherein in (d), setting the first grid area by selecting one of a plurality of grid cells corresponding to a first default grid layout for the first device, or by integrating the plurality of grid cells by user manipulation via mouse input or touch,
   wherein in (e), setting the second grid area by selecting one of the plurality of grid cells corresponding to a second default grid layout for the second device, or by integrating the plurality of grid cells by user manipulation via mouse input or touch,
   wherein the plurality of group components matched to the first grid area in (d) are defaulted as hidden items in the second device, and
   wherein a portion of all of the plurality of group components defaulted as hidden items in (e) are matched by user manipulation via mouse input or touch within the plurality of second grid regions.

2. The grid layout setting method of claim 1, further comprising:
   (g) displaying the grid template of the multi-device corresponding to a development screen resolution of the program development device among the multi-devices on the development screen, thereby enabling program development.

3. The grid layout setting method of claim 2, wherein (g) changes the grid template displayed on the development screen to correspond to the development screen resolution that changes as a width of the development screen changes.

4. A non-transitory computer-readable medium storing computer executable instructions for performing a grid layout setting method when executed by a program development device for developing multi-device responsive page, comprising:
   (a) executing a setting window for a grid layout according to user input;
   (b) confirming application of adaptive settings;
   (c) if the adaptive settings are applied as a result of the confirmation, displaying a plurality of grid layout setting screens for each multi-device within the setting window;
   (d) setting a plurality of first grid areas for a first device of the multi-devices within a first grid layout setting screen of the plurality of grid layout setting screens, and matching a plurality of group components corresponding to one grid item to each of the plurality of first grid areas;
   (e) setting a plurality of second grid areas for a second device of the multi-devices within a second grid layout setting screen of the plurality of grid layout setting screens, and matching a portion or all of the plurality of group components to each of the plurality of second grid areas; and (f) upon completion of setting up the grid layout for the multi-devices, generating grid templates for each multi-device, wherein a responsive Page for the multi-devices is developed corresponding to the grid templates for each multi-device, wherein in (d), setting the first grid area by selecting one of a plurality of grid cells corresponding to a first default grid layout for the first device, or by integrating the plurality of grid cells by user manipulation via mouse input or touch, wherein in (e), setting the second grid area by selecting one of the plurality of grid cells corresponding to a second default grid layout for the second device, or by integrating the plurality of grid cells by user manipulation via mouse input or touch, wherein the plurality of group components matched to the first grid area in (d) are defaulted as hidden items in the second device, and wherein a portion of all of the plurality of group components defaulted as hidden items in (e) are matched by user manipulation via mouse input or touch within the plurality of second grid regions.

5. The non-transitory computer-readable medium of claim 4, further comprising:

(g) displaying the grid template of the multi-device corresponding to a development screen resolution of the program development device among the multi-devices on the development screen, thereby enabling program development.

6. The non-transitory computer-readable medium of claim 5, wherein (g) changes the grid template displayed on the development screen to correspond to the development screen resolution that changes as a width of the development screen changes.

* * * * *